(12) United States Patent
Takahashi (10) Patent No.: US 7,884,600 B2
(45) Date of Patent: Feb. 8, 2011

(54) ROTATION ANGLE DETECTOR AND BEARING WITH ROTATION ANGLE DETECTOR

(75) Inventor: Toru Takahashi, Iwata (JP)

(73) Assignee: NTN Corporation, Osaka (JP)

(*) Notice: Subject to any disclaimer, the term of this patent is extended or adjusted under 35 U.S.C. 154(b) by 386 days.

(21) Appl. No.: 12/087,417

(22) PCT Filed: Nov. 30, 2006

(86) PCT No.: PCT/JP2006/323907

§ 371 (c)(1),
(2), (4) Date: Jul. 3, 2008

(87) PCT Pub. No.: WO2007/077700

PCT Pub. Date: Jul. 12, 2007

(65) Prior Publication Data

US 2009/0072819 A1 Mar. 19, 2009

(30) Foreign Application Priority Data

Jan. 6, 2006 (JP) .............................. 2006-001234
Jan. 10, 2006 (JP) .............................. 2006-002250
Jan. 10, 2006 (JP) .............................. 2006-002251

(51) Int. Cl.
*G01B 7/30* (2006.01)
(52) U.S. Cl. .............................. 324/207.25; 324/207.21; 324/174
(58) Field of Classification Search ........................ None
See application file for complete search history.

(56) References Cited

U.S. PATENT DOCUMENTS

2004/0150391 A1 8/2004 Matsuzaki et al.
2005/0225321 A1* 10/2005 Kurumado ............. 324/207.21

FOREIGN PATENT DOCUMENTS

| JP | 2002-243407 | 8/2002 |
| JP | 2003-148999 | 5/2003 |
| JP | 2004-37133 | 2/2004 |

OTHER PUBLICATIONS

International Search Report mailed Jan. 23, 2007 in connection with the International application No. PCT/JP2006/323907.
International Preliminary Report Patentability mailed on Jul. 17, 2008 and issued in corresponding International Patent Application No. PCT/JP2006/323907.

\* cited by examiner

*Primary Examiner*—Jay M Patidar (57) ABSTRACT

To provide a rotation angle detecting device, in which undesirable noises from an angle calculating circuit can be reduced to increase a detection accuracy, outputs of four linear magnetic sensor arrays arranged on a non-rotatable member confronting a magnetic generating element and arranged in a plane perpendicular to the axis of rotation, the sensor arrays being arranged along four sides of an imaginary rectangular shape, are read out by signal read-out circuits, and then converted into digital signals by AD converting circuits in order to calculate an angle of rotation of the magnetic generating element by an angle calculating circuit. The signal read-out circuits and the AD converter circuits are arranged outside of the magnetic sensor arrays arranged in a generally rectangular pattern, and the angle calculating circuit is arranged inside of the magnetic sensor arrays, all being mounted on a semiconductor chip.

8 Claims, 11 Drawing Sheets

ROTATION ANGLE DETECTOR AND BEARING WITH ROTATION ANGLE DETECTOR

CROSS REFERENCE TO RELATED APPLICATIONS

This application claims the benefit under 35 U.S.C. Section 371, of PCT International Application Number PCT/JP2006/323907, filed Nov. 30, 2006 which claimed priority to the following Japanese Applications:
2006-001234 filed on Jan. 6, 2006;
2006-002250 filed on Jan. 10, 2006; and
2006-002251 filed on Jan. 10, 2006 in Japan, the contents of which are incorporated herein by reference.

BACKGROUND OF THE INVENTION

1. Field of the Invention

The present invention relates to a rotation angle detecting device for detecting the number of rotations in various machines and equipments, for example, for detecting the number of rotations for the purpose of controlling a compact motor or for detecting the number of rotations for the purpose of detecting of a position of a business machine or equipment, and also to a bearing assembly equipped with such rotation angle detecting device.

2. Description of the Prior Art

Figure 13:
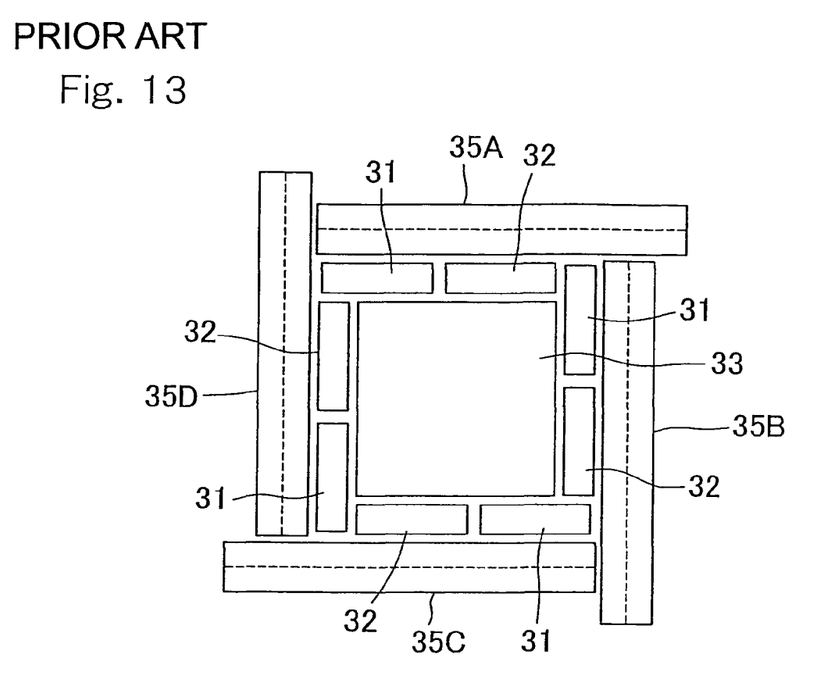
FIG. 13 is a plan view showing an example of arrangement of the magnetic sensor arrays, the signal read-out circuits and the angle calculating circuit on the semiconductor chip employed in a conventional rotation angle detecting device.

A rotation angle detecting device that can be incorporated in a small size machine and is capable of detecting the rotation angle with high precision has been suggested, in which a magnetic sensor array is employed. (See, for example, the Japanese Laid-open Patent Publication No. 2004-37133, published Feb. 5, 2004). This is of a type, in which magnetic sensor arrays each including a plurality of magnetic sensor elements (MAGFET) is integrated on a sensor chip together with signal amplifying circuits, analog-to-digital (AD) converter circuits and a digital signal processing circuit and such sensor chip is disposed in face-to-face relation with a magnet arranged on a rotatable member. In such case, the magnet is of a kind having an anisotropy in a circumferential direction about the axis of rotation and, on the sensor chip referred to above, four magnetic sensor arrays 35A to 35D are arranged in a generally rectangular pattern, each array extending along one of the four sides of the rectangular shape, as shown in FIG. 13. The digital signal processing circuit 33 is disposed inside the rectangular arrangement of the magnetic sensor arrays 35A to 35D.

With the rotation angle detecting device so structured and so configured as hereinabove described, the magnetic sensor arrays 35A to 35D are utilized to detect a magnetic field applied in a direction perpendicular to the sensor chip and respective outputs from those magnetic sensor arrays 35A to 35D are read out by the digital signal processing circuit 33 through the associated signal amplifier circuits 31 and the associated AD converting circuits 32, so that the digital signal processing circuit 33 can detect a zero-crossing-position, which corresponds to an NS boundary of the detected magnetic field on each of the sensor arrays 35A to 35D, to thereby calculate the angle of rotation of the magnet.

In the rotation angle detecting device of the structure described above, pixels forming each of the magnetic sensor arrays 35A to 35D are made up of a plurality of magnetic sensor elements connected parallel to each other so that effects which may be brought about by sensor noises and offset errors, can be reduced by averaging. Although increase of the number of the magnetic sensor elements that are to be connected parallel to each other may result in reduction of the noise, the area occupied by each pixel increases. On the other hand, in terms of highlighting the detecting capability, it is desirable not to increase the pitch of arrangement between each neighboring pixels so much, and, therefore, the magnetic sensor elements that are connected parallel to each other are arranged in a direction widthwise of the magnetic sensor arrays 35A to 35D. As a result, the magnetic sensor arrays 35A to 35D tend to have an increased line width.

In this case, in the circuit configuration in which each of the signal amplifying circuits 31 and each of the AD converting circuits 32 are disposed between the digital signal processing circuit 33 and the respective magnetic sensor array 35A to 35D as shown in FIG. 13, an increase of the width of each of the magnetic sensor arrays 35A to 35D makes it difficult to secure a sufficient space for installation of the associated signal amplifying circuits 31 and the associated AD converting circuits 32.

Also, the digital signal processing circuit 33 has a digital circuit configuration and tends to break out considerable digital noises and, therefore, the signal amplifying circuits 31 and the AD converting circuits 32, both located peripheral to the digital signal processing circuit 33 and having an analog circuit configuration, tend to be adversely affected, constituting a cause of deterioration of the detecting accuracy with which the angle can be detected.

SUMMARY OF THE INVENTION

An object of the present invention is to provide a rotation angle detecting device, in which undesirable effects brought about by noises from an angle calculating circuit can be reduced to increase the angle detecting accuracy and also to provide a bearing assembly having such rotation angle detecting device incorporated therein.

The rotation angle detecting device of the present invention is a rotation angle detecting device which includes a magnetic generating element arranged on a rotatable member and having a magnetic anisotropy in a circumferential direction about the axis of rotation; four linear magnetic sensor arrays arranged on a non-rotatable member confronting the magnetic generating element in a direction along the axis of rotation and arranged in a plane perpendicular to the axis of rotation, each of the sensor arrays being arranged along one of four sides of an imaginary rectangular shape; a signal read-out circuit for reading respective outputs of the four magnetic sensor arrays an AD converting circuit for converting each of the signals so read out into a respective digital signal; and an angle calculating circuit for calculating the angle of rotation of the magnetic generating element from an output of the AD converting circuit. The magnetic sensor arrays, the signal read-out circuit, the AD converting circuit and the angle calculating circuit are all mounted on one semiconductor chip, the signal read-out circuit and the AD converting circuit are arranged outside the magnetic sensor arrays arranged in a generally rectangular pattern, and the angle calculating circuit is arranged inside the magnetic sensor arrays arranged in a generally rectangular pattern.

According to the above described construction, since the signal read-out circuit and the AD converting circuit are arranged outside lines of the magnetic sensor arrays arranged in a generally rectangular pattern and the angle calculating circuit is arranged inside the lines of the magnetic sensor arrays, the possibility can be minimized that effects of noises generated incident to operation of the angle calculating circuit, which is a digital circuit, are extended to the signal read-out circuit, which is operable to amplify a fine sensor signal, and the AD converting circuit, which is operable to convert the signal so amplified into a digital numeral.

Accordingly, the sensor signal having a minimized noise can be read out from the magnetic sensor arrays and an angle of rotation can be stably detected, making it possible to increase the angle detecting accuracy.

Also, in view of the fact that the signal read-out circuit, which is an analog circuit, and the AD converting circuit are arranged outside the lines of the magnetic sensor arrays, it is possible to secure a sufficiently large shield area around the angle calculating circuit and, accordingly, a further stabilized angle detecting operation can be realized. In addition, arranging the signal read-out circuit and the AD converting circuit in this way enables a maximized utilization of a circuit forming surface area of the semiconductor chip.

In the present invention, an outer periphery of the angle calculating circuit may be surrounded by a shield pattern so that a gap area between the magnetic sensor arrays and the angle calculating circuit is formed as a digital noise shielding area. In the case of this construction, it is possible to shield digital noises, which emanate from the angle calculating circuit, from intruding the magnetic sensor arrays, resulting in a further increase of the angle detecting accuracy.

In the present invention, each of the magnetic sensor array may be divided into two magnetic sensor element sets and may be associated with two signal processing circuits, each of which includes the signal read-out circuit and the AD converting circuit and corresponds to each of the two magnetic element sets, so that the two signal processing circuits simultaneously read out signals from respective magnetic element sets.

According to this construction, since the two signal processing circuits are employed for each of the magnetic sensor arrays along those respective sides so that the signal read-out from the magnetic sensor element sets, which are formed by dividing the corresponding magnetic sensor array into two portions, is carried out on a sharing basis, the length of time required to read out the detection signals from the magnetic sensor arrays can be reduced to half that required in the conventional case even through the number of the magnetic sensor elements forming each of the magnetic sensor arrays that are arranged is too many. Also, once the length of time required to accomplish the read-out is reduced, the duration required to detect the angle of rotation of the magnetic generating element can be reduced and, accordingly, not only can the angle detecting rate be increased, but the detection delay time required between the start of signal read-out and the output of the angle detection result can also be reduced.

As a result thereof, application is possible to the detection of a high speed rotating object and a control system that requires a high speed response. Also, since the structure is compact and a highly accurate angle detection can be accomplished, a further high speed response is possible.

In the present invention, the two signal processing circuits may be so associated with each of the magnetic sensor arrays as to read out from the magnetic sensor element sets corresponding respectively to opposite end portions into which the magnetic sensor array is divided in a direction lengthwise thereof. Where each of the magnetic sensor arrays is divided into the opposite end portions as hereinabove described, signal wirings required of the read-out can be drawn outwardly from the opposite ends of each of the magnetic sensor arrays. Accordingly, without ruining the symmetry of the array arrangement, the magnetic sensor elements can be arranged. Also, where the magnetic sensor arrays and the signal processing circuits are to be integrated on the semiconductor chip, the arrangement of the magnetic sensor arrays and the signal processing circuits come to be symmetrical on left and right sides and no extra wiring is required, resulting in an increase of the wiring efficiency.

In the present invention, the two signal processing circuits associated with each of the magnetic sensor arrays may include respective signal read-out circuits for reading out and amplifying an output from the magnetic sensor array, and the AD converting circuit for converting an output of the signal read-out circuit into a digital signal is commonly utilized by the two signal processing circuits. In the case of this construction, since there is no need to use two AD converting circuits for each of the magnetic sensor arrays and, accordingly, where the sensor arrays and the signal processing circuits are to be integrated on the semiconductor chip, the semiconductor circuit, in which the surface area of the semiconductor chip is highly efficiently utilized, can be realized. As a result thereof, the surface area of the entire circuitry can be reduced, allowing the cost to be minimized.

In the present invention, four auxiliary magnetic sensor arrays may be additionally arranged outside four corners of the rectangular shape depicted by the four magnetic sensor arrays.

According to this construction, separate from the four magnetic sensor arrays depicting the rectangular shape, the auxiliary magnetic sensor arrays supplemental to the magnetic sensor arrays are arranged outside the four corners of the rectangular shape, respectively. For this reason, even when the arrangement of the magnetic generating element displaces axially considerably relative to the magnetic sensor arrays, the zero-crossing-position can be detected by the auxiliary magnetic sensor arrays and the angle of rotation of the magnetic generating element can be detected stably with a high accuracy, without increasing a detection error resulting from the displacement in arrangement.

In the present invention, the signal read-out circuit and the AD converting circuit for converting a read-out signal therefrom into a digital signal, which is in turn supplied to the angle calculating circuit, may be provided for each of the auxiliary sensor arrays arranged outside the four corners of the rectangular shape. In the case of this construction, the outputs from the magnetic sensor arrays and the outputs from the auxiliary magnetic sensor arrays can be simultaneously processed in parallel relation to each other and, therefore, the detecting accuracy and the detecting stability can be increased while securing the angle detecting rate, without any increase in signal processing time which would otherwise result from an increase of the auxiliary magnetic sensor arrays.

The rotation angle detecting device equipped bearing assembly according to the present invention is the one equipped with the rotation angle detecting device of any one of the above described construction. In such case, the magnetic generating element is arranged on a rotatable raceway ring, which is a rotatable member. The magnetic sensor arrays are arranged on a stationary raceway ring, which is a non-rotatable member.

By integrating the rotation angle detecting device with the bearing assembly in the manner described above, the number of component parts used in the bearing utilizing machine and the number of assembling steps can be reduced and compactization can be accomplished.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
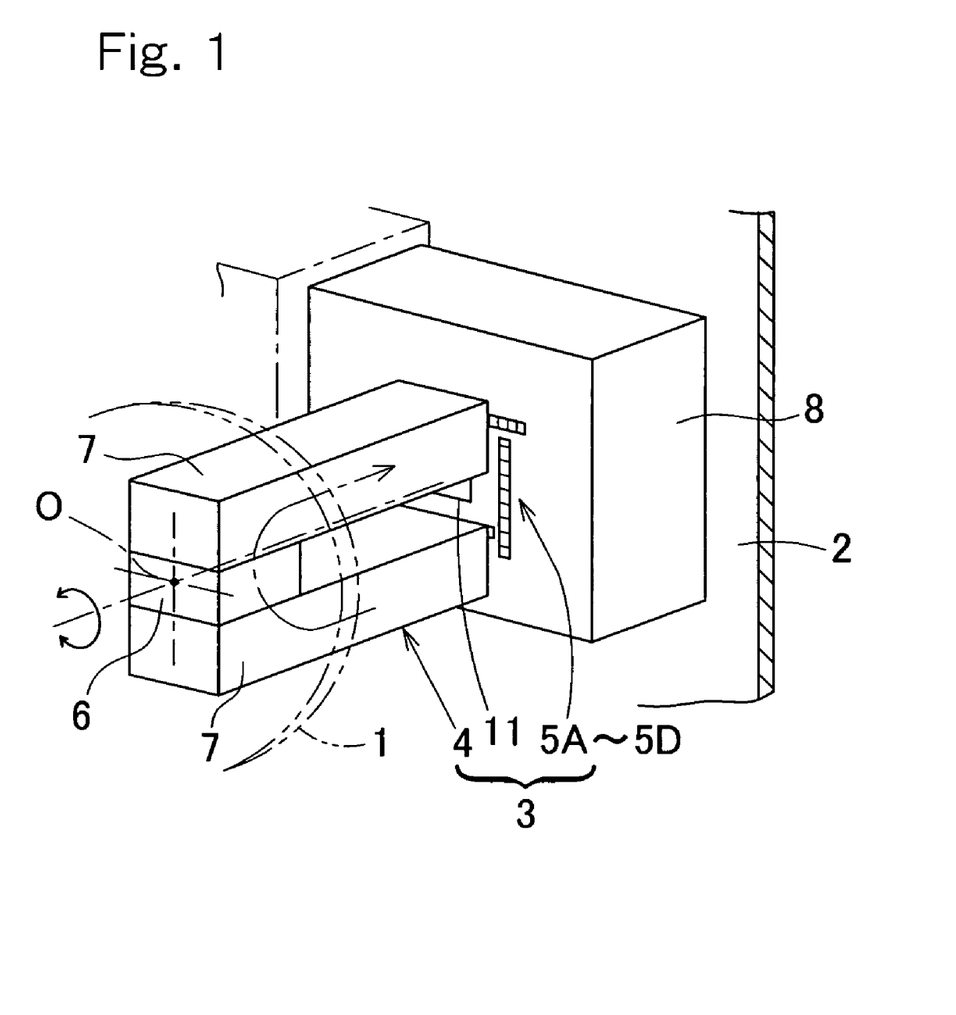
FIG. 1 is a perspective view showing a conceptual construction of a rotation angle detecting device according to a first preferred embodiment of the present invention.

A first preferred embodiment of the present invention will be described with reference to the accompanying drawings. FIG. 1 illustrates a principal construction of a rotation angle detecting device according to this embodiment. A rotatable member 1 and a non-rotatable member 2 are a member on the relatively rotatable side and a member on the relatively non-rotating sides, respectively. The rotation angle detecting device 3 includes a magnetic generating element 4 arranged on the rotatable member 1, four linear magnetic sensor arrays 5A to 5D arranged on the non-rotatable member 2, signal read-out circuits 9A to 9D for reading out respective outputs from the four magnetic sensor arrays 5A to 5D, AD converting circuits 10A to 10D for converting signals, which have been so read out, into respective digital signals, and an angle calculating circuit 11 operable in response to respective outputs from the AD converting circuits 10A to 10D to calculate the angle of rotations of the magnetic generating element 4.

The magnetic generating element 4 is of a type, in which magnetic generated by such magnetic generating element 4 has an anisotropy in a circumferential direction about the axis O of rotation of the rotatable member 1, and is employed in the form of a simple body of permanent magnet or a composite body of a permanent magnet and a magnetic material. In the instance as shown, the magnetic generating element 4 has a structure, in which a single permanent magnet 6 is sandwiched between two yokes 7 and 7, each made of a magnetic material, so as to represent a general shape similar to a bifurcated or forked shape, with one of the magnetic yokes 7 having an N magnetic pole at one end thereof and the other of the magnetic yokes 7 having an S magnetic pole at one end thereof. With the magnetic generating element 4 of the structure so designed as hereinabove described, it can be constructed simple and rigid. This magnetic generating element 4 is fitted to the rotatable member 1 with the axis O of rotation thereof in alignment with the axis of the magnetic generating element 4, and when the rotatable member 1 is driven, the N and S magnetic poles revolves about the axis O of rotation.

Figure 2:
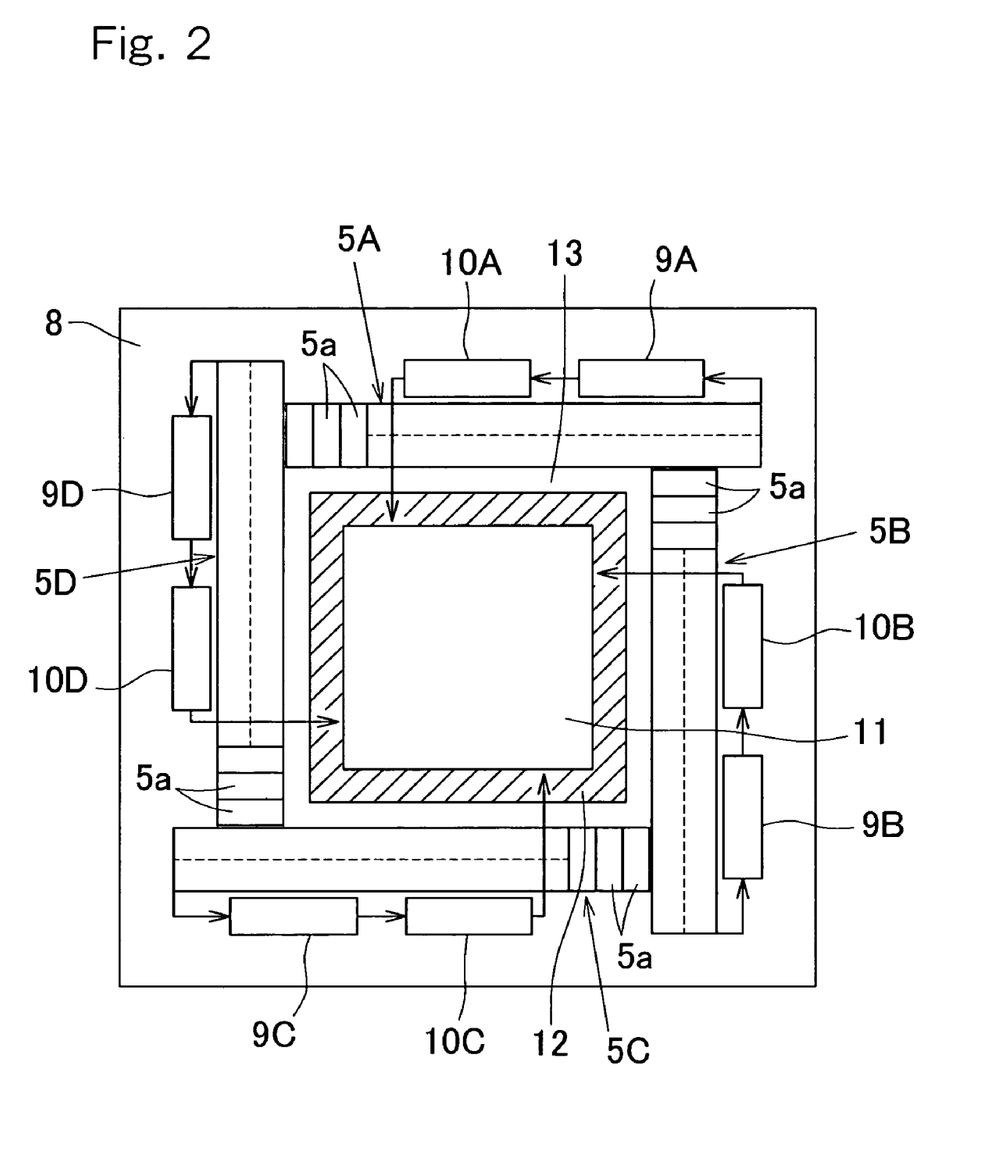
FIG. 2 is a plan view showing an example of arrangement of magnetic sensor arrays, signal read-out circuits and an angle calculating circuit on a semiconductor chip employed in the rotation angle detecting device shown in FIG. 1.

The magnetic sensor arrays 5A to 5D is a sensor for detecting magnetism emanating from the magnetic generating element 4 and are arranged on the non-rotatable member 2 so as to confront the magnetic generating element 4 in a direction along the axis O of rotation of the rotatable member 1. As shown in FIG. 2, each of the magnetic sensor arrays 5A to 5D includes an array of a plurality of magnetic sensor elements 5a, each forming a pixel, arranged in line with each other and is arranged on a plane perpendicular to the axis O of rotation so as to extend along one of four sides of an imaginary rectangular shape. In this case, the geometric center of the rectangular shape is contained by the axis O of rotation of the rotatable member 1. It is to be noted that at four corners of the rectangular shape depicted by the magnetic sensor arrays 5A to 5D, each neighboring magnetic sensor arrays are rendered to be discontinued. In view of this, each of the magnetic sensor arrays 5A to 5D is laid with one end thereof protruding outwardly at a corresponding corner of the rectangular shape, so that an area, which would be emptied at the corners of the sensor arrangement, can be supplementally filled up by that end of the respective magnetic sensor arrays 5A to 5D which extend outwardly. The magnetic sensor arrays 5A to 5D so constructed as hereinabove described are formed on a surface portion of a single semiconductor chip 8 fitted to the non-rotatable member 2, which confronts the magnetic generating element 4. The semiconductor chip 8 is, for example, a silicon chip.

The signal read-out circuits 9A to 9D and the AD converting circuits 10A to 10D are in the form of an analog circuit and are employed one for each magnetic sensor arrays 5A to 5D, so that signals from the magnetic sensor arrays 5A to 5D can be read out and processed, respectively. In other words, the outputs from the magnetic sensor arrays 5A to 5D are read out respectively from the signal read-out circuits 9A to 9D and the signals so read out are converted into digital signals respectively by the AD converting circuits 10A to 10D. Each of the signal read-out circuits 9A to 9D is comprised of a corresponding amplifying circuit or the like for amplifying the sensor signal from the associated magnetic sensor arrays 5A to 5D. The signal read-out circuits 9A to 9D and the AD converting circuits 10A to 10D are arranged in an area outside the arrangement of the magnetic sensor arrays 5A to 5D arranged in a generally rectangular pattern so as to extend along the associated magnetic sensor arrays 5A to 5D. The digital signal so converted by the associated AD converting circuits 10A to 10D are supplied to the angle calculating circuit 11.

The angle calculating circuit 11 is in the form of an integrated circuit of a digital circuit configuration and is integrated on the semiconductor chip 8 together with the magnetic sensor arrays 5A to 5D, the signal read-out circuits 9A to 9D and the AD converting circuits 10A to 10D. This angle calculating circuit 11 is arranged within an area inside the arrangement of the magnetic sensor arrays 5A to 5D arranged in the rectangular pattern. An outer periphery of the angle calculating circuit 11 is surrounded by a shield pattern 12 in the form of a ground pattern and a gap area delimited between the angle calculating circuit 11 and the magnetic sensor arrays 5A to 5D is secured as a digital noise shielding area 13 of a relatively large surface area. The shielding area 13 has a decoupling capacitor (not shown) arranged for a source of an electric power for the angle calculating circuit 11 so that it can be isolated from a supply of a through current, flowing through digital circuit elements forming the angle calculating circuit, and from an external circuit.

Figure 3:
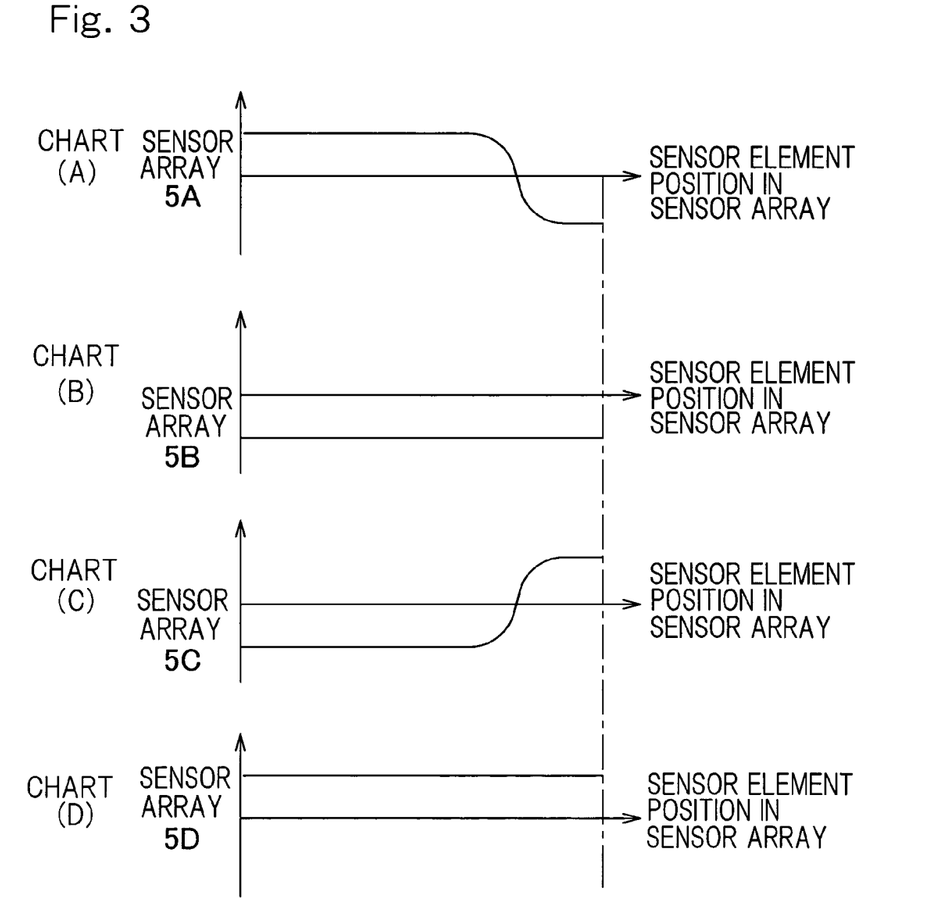
FIG. 3 shows charts showing waveforms of respective outputs from the magnetic sensor arrays.
Figure 4:
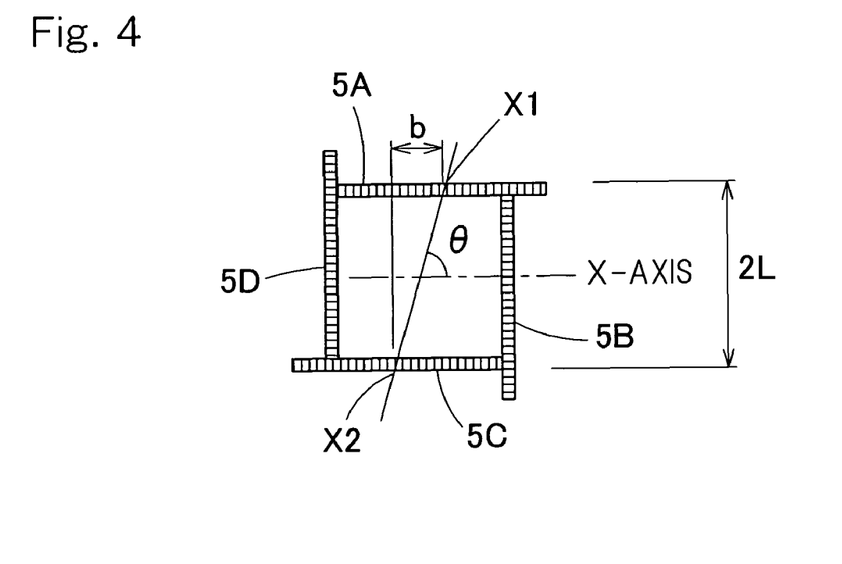
FIG. 4 is an explanatory diagram showing an angle calculating process performed by the angle calculating circuit.

FIGS. 3 and 4 illustrate explanatory diagrams showing an angle calculating process performed by the angle calculating circuit 11. In particular, Charts A to D shown in FIG. 3 show waveforms of the magnetic sensor arrays 5A to 5D, respectively, which are exhibited when the rotatable member 1 undergoes rotation, in which the axis of abscissas represents positions of the magnetic sensor elements 5a in the respective magnetic sensor arrays 5A to 5D, which are arranged in a line, and the axis of ordinates represents the intensity of the magnetic field detected.

Let it be assumed that zero-crossing-positions, which is a boundary between the N magnetic pole and the S magnetic pole of the magnetic generating element 4 lie at respective positions X1 and X2 as shown in FIG. 4. In this condition, the respective outputs from the magnetic sensor arrays 5A to 5D are represented by the respective waveforms in Charts A to D as shown in FIG. 3. Accordingly, the zero-crossing-positions X1 and X2 can be calculated by collinear approximation of the respective outputs from the magnetic sensor arrays 5A to 5D.

The angle calculation can be carried out with the following equation (1):

$$\theta = \tan^{-1}(2L/b) \quad (1)$$

where $\theta$ represents the angle of rotation of the magnetic generating element 4, which is expressed in terms of the absolute angle, 2L represents the length of one of the four sides depicted by the magnetic sensor arrays 5A to 5D and b represents the transverse length between the zero-crossing-positions X1 and X2 as measured in a transverse direction.

Where the zero-crossing-positions X1 and X2 lie on the magnetic sensors 5B and 5D, respectively, the angle of rotation $\theta$ can be calculated in a manner similar to that described above, using data on the zero-crossing-positions which can be obtained from the respective outputs of the magnetic sensor arrays 5B and 5D.

It is to be noted that since each of the magnetic sensor arrays 5A to 5D is laid with one end thereof protruding outwardly at a corresponding corner of the rectangular shape, so that an area, which would be emptied at the corners of the sensor arrangement, can be supplementally filled up by that end of the respective magnetic sensor arrays 5A to 5D which extend outwardly, the angle of rotation can be calculated by detecting the zero-crossing-positions, even when the line of the NS boundary in the magnetic field distribution exists in proximity to the four corners of the rectangular shape depicted by the magnetic sensor arrays 5A to 5D.

As described above, by using the rotation angle detecting device 3, since the angle of rotation is calculated from the zero-crossing-positions in the magnetic field distribution, the detecting accuracy can be increased. Also, since information on the angle is acquired from the pattern of magnetic fields, no axial alignment of the rotation angle detecting device 3 is needed, thus facilitating the fitting.

In particular, in this rotation angle detecting device 3, since the magnetic sensor arrays 5A to 5D, the signal read-out circuits 9A to 9D, the AD converting circuits 10A to 10D and the angle calculating circuit 11 are mounted on the single semiconductor chip 8, the signal read-out circuits 9A to 9D and the AD converting circuits 10A to 10D are arranged outside the arrangement of the magnetic sensor arrays 5A to 5D arranged in the generally rectangular pattern, and the angle calculating circuit 11 is arranged inside the arrangement of the magnetic sensor arrays 5A to 5D, it is possible to minimize the effects brought about by noises incident to the operation of the angle calculating circuit 11 that is a digital circuit, which would otherwise be brought on the signal read-out circuits 9A to 9D which amplify weak sensor signals and the AD converting circuits 10A to 10D which are operable to digitalize the amplified signals. Accordingly, it is possible to extract the sensor signals, having a minimized noise, from the magnetic sensor arrays 5A to 5D, and to enable a stabilized detection of the angle, resulting in an increase of the angle detecting accuracy.

Also, positioning the signal read-out circuits 9A to 9D and the AD converting circuits 10A to 10D, both of which are analog circuits, outside the arrangement of the magnetic sensor arrays 5A to 5D makes it possible to secure the sufficiently large shielding area 13 around the angle calculating circuit 11 and, also, to realize a stabilized angle detecting operation. Also, positioning the signal read-out circuits 9A to 9D and the AD converting circuits 10A to 10D in the manner described above makes it possible to utilize the circuit forming surface area of the semiconductor chip 8 efficiently, resulting in reduction of the cost. Yet, it can be easily realized to construct the pixels by arranging the magnetic sensor elements 5a forming the magnetic sensor arrays 5A to 5D, in a direction widthwise of the respective lines of the magnetic sensor arrays 5A to 5D and connecting them in parallel to each other, in order to the noises of the sensor signals are reduced without being affected by the arrangement of the signal read-out circuits 9A to 9D and the AD converting circuits 10A to 10D.

In addition, since in this embodiment the outer periphery of the angle calculating circuit 11 is surrounded by the shielding pattern 12 which is comprised of the ground pattern, it is possible to shield digital noises, which emanate from the angle calculating circuit 11, from intruding into the magnetic sensor arrays 5A to 5D, with the angle detecting accuracy consequently increased further.

A second preferred embodiment of the present invention will be described with reference to the accompanying drawings. The rotation angle detecting device shown in FIG. 5 has a principal construction substantially similar to that described in connection with the first embodiment shown in FIG. 1, but is includes two signal processing circuits 15A1, 15A2, to 15D1, 15D2 associated respectively with the four magnetic sensor arrays 5A to 5D and also the angle calculating circuit 11 designed to calculate the angle of rotation of the magnetic generating element 4 from respective outputs from those signal processing circuits 15A 1, 15A2 to 15D1, 15D2.

Figure 5:
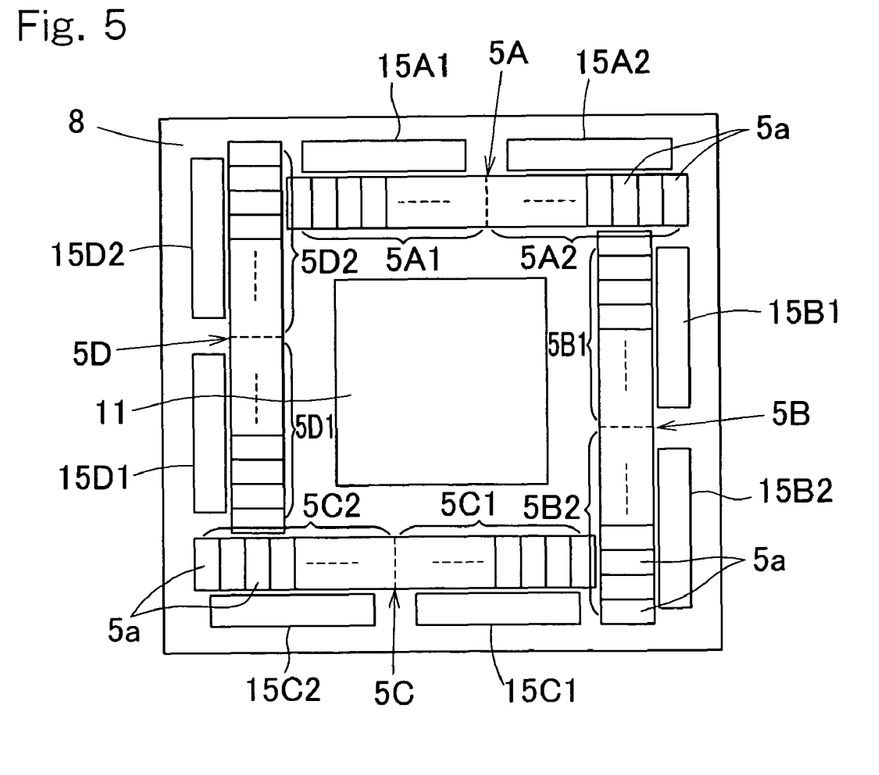
FIG. 5 is a plan view showing an example of arrangement of magnetic sensor arrays, signal read-out circuits and an angle calculating circuit on a semiconductor chip employed in the rotation angle detecting device according to a second preferred embodiment of the present invention.

The magnetic sensor arrays 5A to 5D is a sensor for detecting magnetism emanating from the magnetic generating element 4 and are arranged on the non-rotatable member 2 so as to confront the magnetic generating element 4 in a direction along the axis O of rotation of the rotatable member 1. As shown in FIG. 5, each of the magnetic sensor arrays 5A to 5D includes an array of a plurality of magnetic sensor elements 5a arranged in line with each other and is arranged on a plane perpendicular to the axis O of rotation so as to extend along one of four sides of the imaginary rectangular shape. In this case, the geometric center of the rectangular shape is contained by the axis O of rotation of the rotatable member 1. The magnetic sensor arrays 5A to 5D so constructed as hereinabove described are formed on a surface portion of a single semiconductor chip 8 fitted to the non-rotatable member 2, which confronts the magnetic generating element 4. The semiconductor chip 8 is, for example, a silicon chip.

As shown in FIG. 5, the respective pairs of the two signal processing circuits 15A1, 15A2 to 15D1, 15D2 (FIG. 5) corresponding respectively to the four magnetic sensor arrays 5A to 5D perform their shares of reading out the signal from the respective magnetic sensor arrays 5A to 5D and those signal processing circuits 15A1, 15A2 to 15D1, 15D2 are arranged in an outer peripheral area of the generally rectangular shape depicted by the magnetic sensor arrays 5A to 5D so as to extend along the associated magnetic sensor arrays 5A to 5D. By way of example, the two signal processing circuits 15A1 and 15A2 arranged along the magnetic sensor array 5A are so designed as to individually and simultaneously read out respective signals from magnetic sensor element sets 5A1 and 5A2 that are defined by dividing the magnetic sensor elements 5a, forming the magnetic sensor array 5A, at a line of division intermediate of the sensor longitudinal direction into opposite end portions, that is, intermediate of the length of the magnetic sensor array 5A. In other words, the signal processing circuit 15A1 arranged along one magnetic sensor element set 5A1 reads out the signal from the magnetic sensor element set 5A1 and, simultaneously therewith, the signal processing circuit 15A2 arranged along the other magnetic sensor element set 5A2 reads out the signal from the magnetic sensor element set 5A2. Similarly, the signal processing circuit 15B1 reads out the signal from one magnetic sensor element set 5B1 of the magnetic sensor array 5B and, simultaneously therewith, the signal processing circuit 15B2 reads out the signal from the other magnetic sensor element set 5B2; the signal processing circuit 15C1 reads out the signal from one magnetic sensor element set 5C1 of the magnetic sensor array 5C and, simultaneously therewith, the signal processing circuit 15C2 reads out the signal from the other magnetic sensor element set 5C2; and the signal processing circuit 15D1 reads out the signal from one magnetic sensor element set 5D1 of the magnetic sensor array 5D and, simultaneously therewith, the signal processing circuit 15D2 reads out the signal from the other magnetic sensor element set 5D2.

Figure 6:
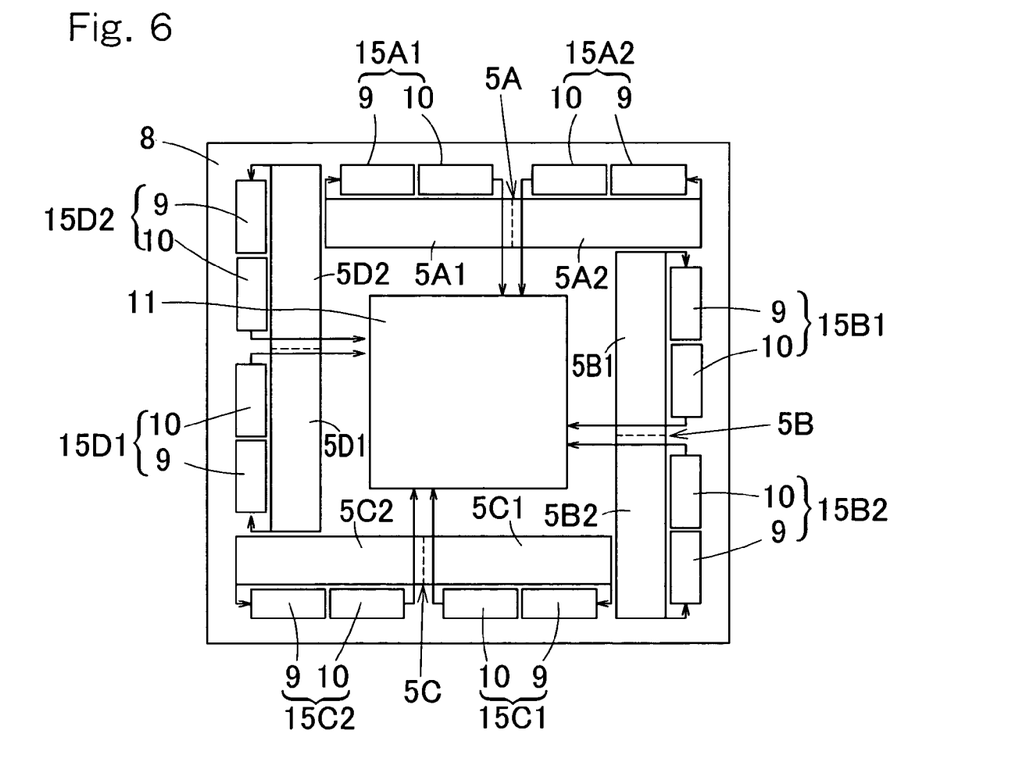
FIG. 6 is a plan view showing a detailed structure of the example of the arrangement shown in FIG. 5.
Figure 7:
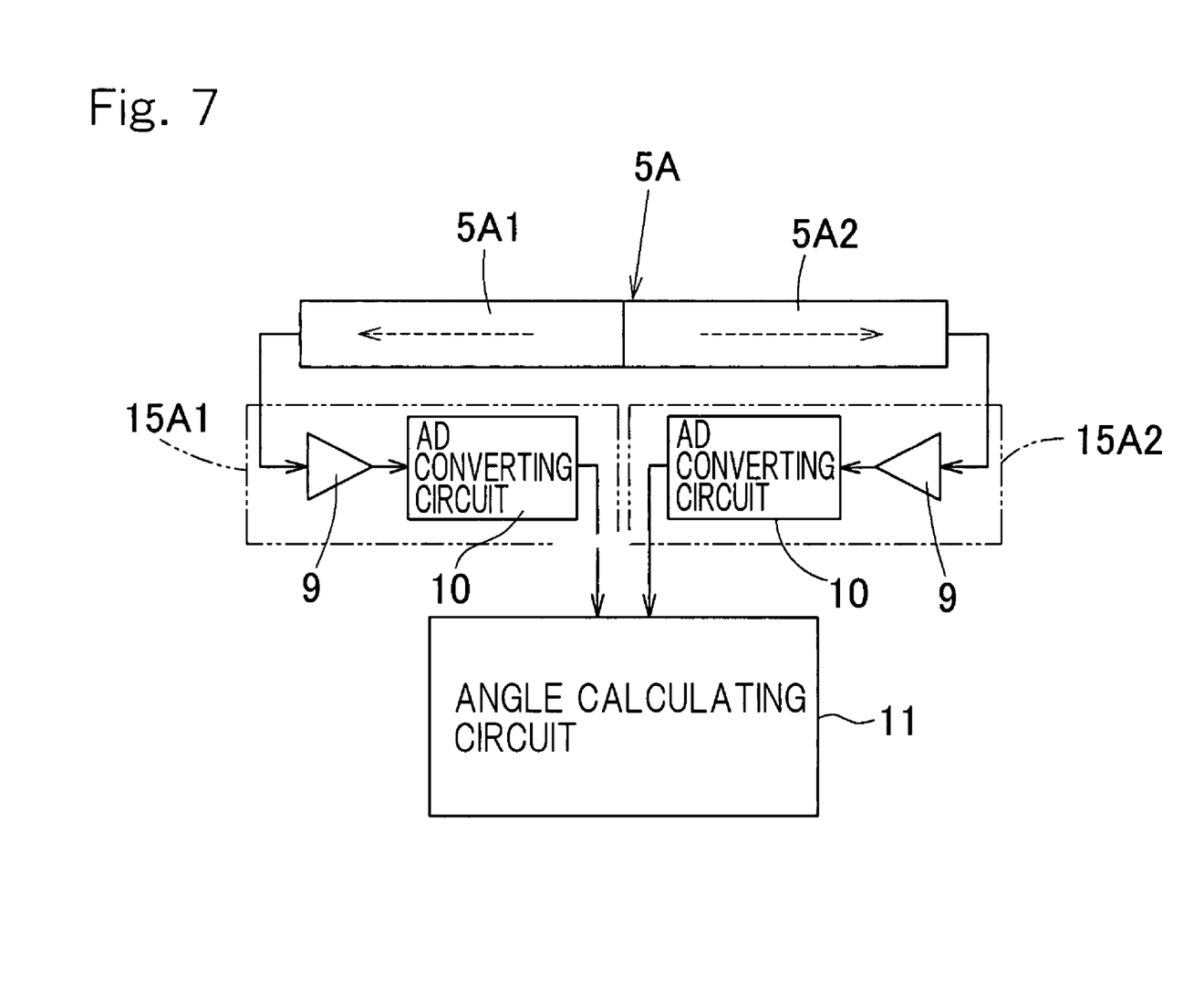
FIG. 7 is a circuit block diagram showing an example of construction of the signal processing circuit.

Each of the two signal processing circuits 15A1, 15A2 to 15D1, 15D2 employed for each of the magnetic sensor arrays 5A to 5D includes, as shown in FIG. 6, a signal read-out circuit 9 for reading out and amplifying an output from the respective sensor arrays 5A to 5D and an AD converting circuit 10 for converting an output from the signal read-out circuit 9 into a digital signal, a converted digital signal being supplied to the angle calculating circuit 11. FIG. 7 illustrates, in a circuit block diagram, a circuit construction including the magnetic sensor array 5A, the two signal processing circuits 15A1 and 15A2 and the angle calculating circuit 11.

Since as hereinabove described, each of the magnetic sensor arrays 5A to 5D is divided into two portions so that two outputs from those two divided portions can be read out by the associated signal processing circuits 15A1, 15A2 to 15D1, 15D2, the length of time required to read out the detection signal from each of the magnetic sensor arrays 5A to 5D can be reduced to half the time required in the conventional case and, therefore, the angle detecting rate can be increased. Also, since a high speed angle detection is possible and the delay time between the start of scanning and the output of data can be reduced, it is possible to increase the response characteristic in the case where it is used in a motor control.

Also, since the two signal processing circuits 15A1, 15A2 to 15D1, 15D2 provided for each of the magnetic sensor arrays 5A to 5D read out a detection signal from a half of the respective sensor arrays 5A to 5D and a detection signal from the rest of the respective sensor arrays 5A to 5D, signal wirings for the signal read-out can be drawn out from opposite ends of each of the magnetic sensor arrays 5A to 5D as shown in FIG. 6. In addition, left and right portions of the arrangement of the magnetic sensor arrays 5A to 5D and the signal processing circuits 15A1, 15A2 to 15D1, 15D2 on the semiconductor chip 8 become symmetrical relative to each other with no extra wirings used and, accordingly, the wiring efficiency can be improved.

Figure 8:
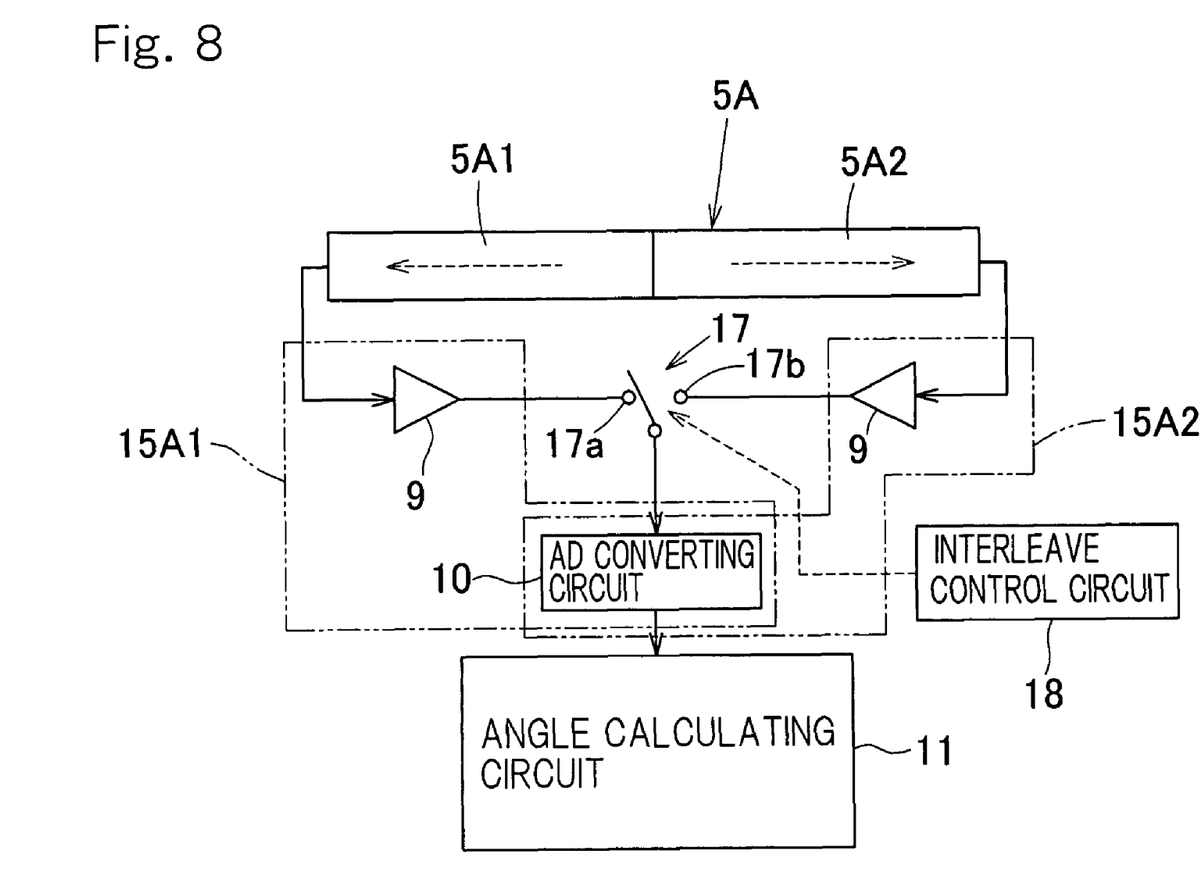
FIG. 8 is a circuit block diagram showing another example of construction of the signal processing circuit.

FIG. 8 illustrates, in a circuit block diagram, another example of circuit configuration of the signal processing circuits 15A1 and 15A2 associated with one magnetic sensor array 5A. In this case, the respective outputs from the signal read-out circuits 9 of the two signal processing circuits 15A 1 and 15A2 are supplied to one AD converting circuit 10 through a switch 17 so that the converting operation of the AD converting circuit 10 can be carried out on an interleaved basis with a view to allowing the two signal processing circuits 15A 1 and 15A2 to commonly utilize such one AD converting circuit 10.

The switching operation of the switch 17 is controlled by an interleave control circuit 18. The switch 17 performs such a switching operation that a movable contact thereof is turned on to contact a fixed contact 17a during, for example, the first half of the period, during which a signal corresponding to one of the magnetic sensor elements 5a is outputted from two of the signal read-out circuits 9, and is turned on to contact a fixed contact 17b during the latter half of such period, and the AD converting circuit 10 is operated at a speed twice the operating speed of the signal processing circuits 15A1 and 15A2. In this way, the output from one of the magnetic sensor element sets 5A1 and the output from the other of the magnetic sensor element sets 5A2 can be converted into respective digital signals alternately by the AD converting circuit 10.

Where each of the signal processing circuits 15A1, 15A2 to 15D1, 15D2 are so constructed as hereinabove described, there is no need to use two AD converting circuits 10 for each of the magnetic sensor arrays 5A to 5D and, accordingly, a semiconductor circuit, in which the surface area of the semiconductor chip 8 is highly efficiently utilized, can be realized. As a result thereof, the surface area of the entire circuitry can be reduced, allowing the cost to be minimized.

The angle calculating circuit 11 is in the form of an integrated circuit and is integrated on the semiconductor chip 8 together with the magnetic sensor arrays 5A to 5D and the signal processing circuits 15A1, 15A2 to 15D1, 15D2. This angle calculating circuit 11 is arranged inside the rectangular arrangement of the magnetic sensor arrays 5A to 5D. Accordingly, the magnetic sensor arrays 5A to 5D, the signal processing circuits 15A1, 15A2 to 15D1, 15D2 and the angle calculating circuit 11 can be arranged snugly and neatly.

As hereinabove described, the rotation angle detecting device 3 is so designed and so configured that the magnetic sensor arrays 5A to 5D are arranged on the plane perpendicular to the axis O of rotation of the rotatable member 1 so as to extend along the respective sides of the imaginary rectangular shape, the two signal processing circuits 15A1, 15A2 to 15D1, 15D2 are associated with the respective magnetic sensor arrays 5A to 5D along those respective sides, the signal read-out from the magnetic sensor element sets, which are formed by dividing the corresponding magnetic sensor arrays 5A to 5D into two potions, is carried out on a sharing basis, and based on the respective outputs from the signal processing circuits 15A1, 15A2 to 15D1, 15D2, the angle of rotation of the magnetic generating element 4 is calculated by the angle calculating circuit 11. Accordingly, the length of time required to read out the detection signals from the magnetic sensor arrays 5A to 5D can be reduced to half that required in the conventional case even through a large number of the magnetic sensor elements 5a forming each of the magnetic sensor arrays 5A to 5D are arranged.

Also, once the length of time required to accomplish the read-out is reduced as described above, the duration required to detect the angle of rotation of the magnetic generating element 4 can be reduced and, accordingly, not only can the angle detecting rate be increased, but the detection delay time required between the start of signal read-out and the output of the angle detection result.

As a result thereof, application is possible to the detection of a high speed rotating object and a control system that requires a high speed response. Also, since the structure is compact and a highly accurate angle detection can be accomplished, a further high speed response is possible.

Figure 9:
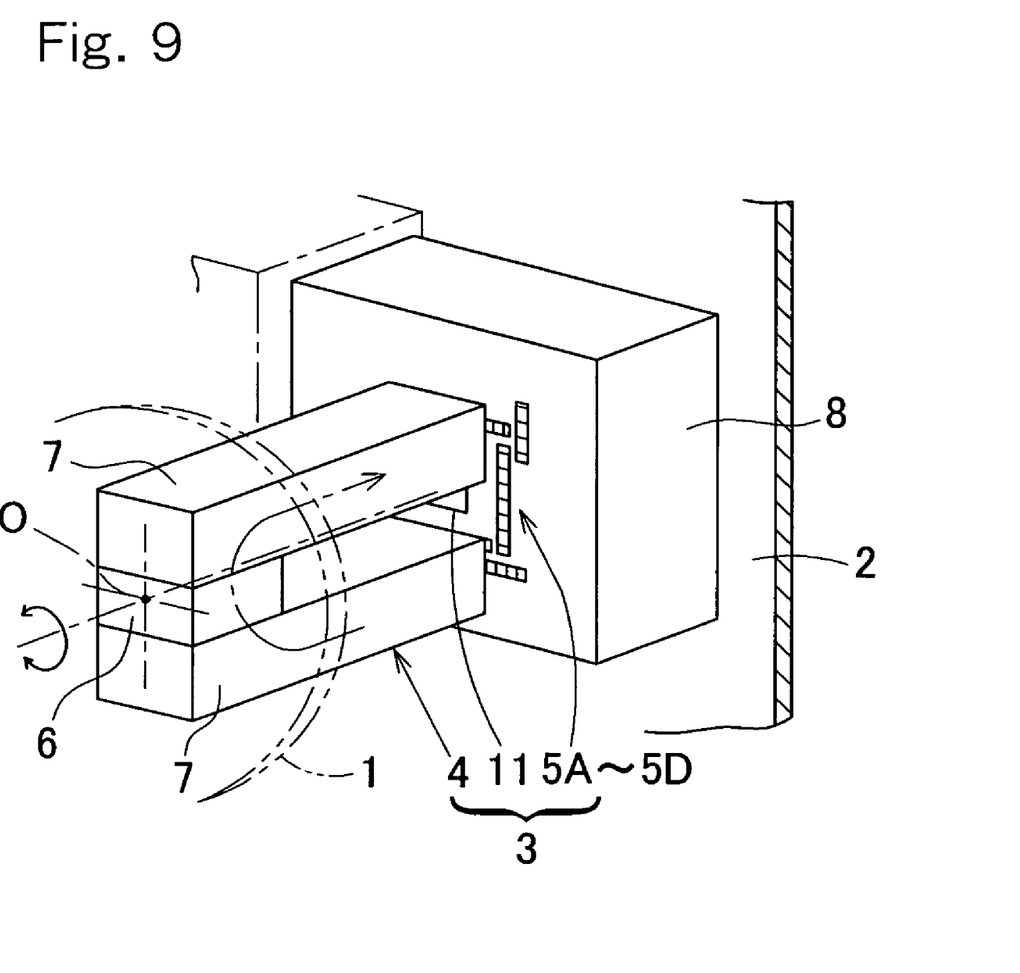
FIG. 9 is a perspective view showing a conceptual construction of the rotation angle detecting device according to a third preferred embodiment of the present invention.

A third preferred embodiment of the present invention will now be described with reference to the accompanying drawings. FIG. 9 illustrates a principal construction of the rotation angle detecting device according to this embodiment. The principal construction of this rotational speed detecting device is substantially similar to that described in connection with the first embodiment shown in FIG. 1, but includes four signal processing circuits 15A to 15D (shown in FIG. 10) for reading out and processing the respective outputs of the four magnetic sensor arrays 5A to 5D arranged on the non-rotatable member 4 and the angle calculating circuit 11 for calculating the angle of rotation of the magnetic generating element 4 from the respective outputs of the signal processing circuits 15A to 15D.

Figure 10:
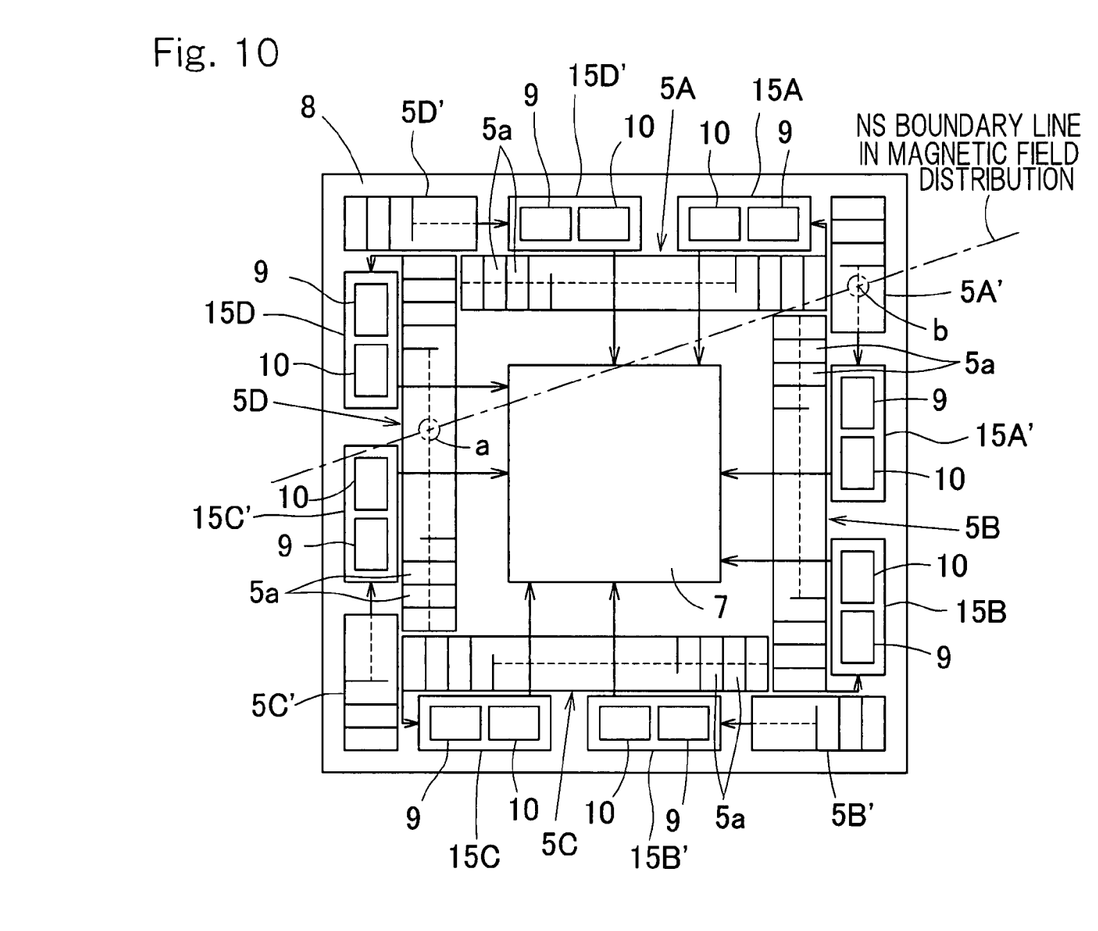
FIG. 10 is a plan view showing an example of arrangement of the magnetic sensor arrays, the signal read-out circuits and the angle calculating circuit on the semiconductor chip employed in the rotation angle detecting device shown in FIG. 9.

The magnetic sensor arrays 5A to 5D is in the form of a sensor for detecting magnetic emanating from the magnetic generating element 4 and are arranged on the non-rotatable member 2 so as to confront the magnetic generating element 4 in a direction along the axis O of rotation of the rotatable member 1. As shown in FIG. 10, each of the magnetic sensor arrays 5A to 5D includes an array of a plurality of magnetic sensor elements 5a, each forming a pixel, arranged in line with each other and is arranged on a plane perpendicular to the axis O of rotation so as to extend along one of four sides of the imaginary rectangular shape. In this case, the geometric center of the rectangular shape is contained by the axis O of rotation of the rotatable member 1. It is to be noted that at four corners of the rectangular shape depicted by the magnetic sensor arrays 5A to 5D, each neighboring magnetic sensor arrays are rendered to be discontinued. The magnetic sensor arrays 5A to 5D so constructed as hereinabove described are formed on a surface portion of a single semiconductor chip 8 fitted to the non-rotatable member 2, which confronts the magnetic generating element 4. The semiconductor chip 8 is, for example, a silicon chip.

The signal read-out circuits 15A to 15D are employed one for each of the magnetic sensor arrays 5A to 5D, each being operable to read out and process, on a sharing basis, the signal outputted from the corresponding sensor arrays 5A to 5D. Each of those signal processing circuits 15A to 15D includes a signal read-out circuit 9 for reading out an output from one of the associated magnetic sensor arrays 5A to 5D, and an AD converting circuit 10 for converting the read-out signal into a digital signal. Those signal processing circuits 15A to 15D are arranged along the respective sensor arrays 5A to 5D in an outer peripheral area of the rectangular shape depicted by the magnetic sensor arrays 5A to 5D. The digital signal converted by each of the AD converting circuits 10 is supplied to the angle calculating circuit 11.

Additional four magnetic sensor arrays 5A' to 5D' are arranged outside the four corner portions of the rectangular shape depicted by the four magnetic sensor arrays 5A to 5D, respectively. Those magnetic sensor arrays 5A' to 5D' are also a sensor for detecting the magnetism emanating from the magnetic generating element 4 and made up of a plurality of magnetic sensor elements 5a arranged in a line. Each of those four magnetic sensor arrays 5A' to 5D' is an auxiliary sensor array which complements a discontinued portion at each of the four corners of the rectangular shape depicted by the four magnetic sensor arrays 5A to 5D. More specifically, at a corner depicted by the neighboring magnetic sensor arrays 5A and 5B, the auxiliary magnetic sensor array 5A' is arranged parallel to the magnetic sensor array 5B. At a corner depicted by the neighboring magnetic sensor arrays 5B and 5C, the auxiliary magnetic sensor array 5B' is arranged parallel to the magnetic sensor array 5C. Also, at a corner depicted by the neighboring magnetic sensor arrays 5C and 5D, the auxiliary magnetic sensor array 5C' is arranged parallel to the magnetic sensor array 5D. Yet, at a corner between the magnetic sensor arrays 5D and 5A, the auxiliary magnetic sensor array 5D' is arranged parallel to the magnetic sensor array 5D.

For each of the auxiliary magnetic sensor arrays 5A' to 5D', one signal processing circuit 15A' to 15D' is employed so that the signal from the corresponding magnetic sensor arrays 5A' to 5D' can be read out and processed on a shearing basis. Each of those signal processing circuits 15A' to 15D' is made up of a signal read-out circuit 9 for reading out a signal from the associated auxiliary magnetic sensor arrays 5A' to 5D' and an AD converting circuit 10 for converting the signal so read out into a digital signal. Those signal processing circuits 15A' to 15D' are arranged in an outer peripheral area of the rectangular shape depicted by the magnetic sensor arrays 5A to 5D, so as to be oriented in a direction along the arrangement of the corresponding magnetic sensor arrays 5A' to 5D'. The digital signals converted by the AD converting circuits 10 of the respective signal processing circuits 15A' to 15D' are also supplied to the angle calculating circuit 11.

The angle calculating circuit 11 is in the form of an integrated circuit and is integrated on the semiconductor chip 8 together with the magnetic sensor arrays 5A to 5D, 5A' to 5D' and the signal processing circuits 15A to 15D, 15A' to 15D'. The angle calculating circuit 11 is arranged inside the rectangular arrangement of the four magnetic sensor arrays 5A to 5D. In this way, the magnetic sensor arrays 5A to 5D, 5A' to 5D', the signal processing circuits 15A to 15D, 15A' to 15D' and the angle calculating circuit 11 can be neatly and snugly arranged.

Figure 11:
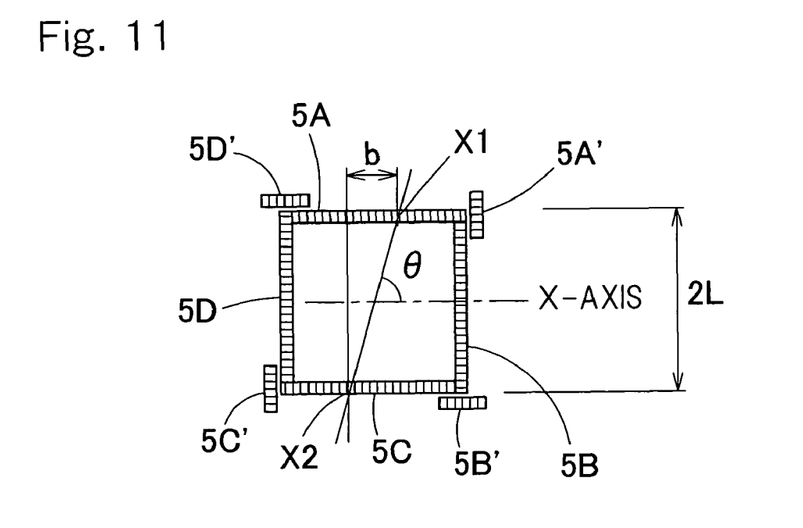
FIG. 11 is an explanatory diagram showing the fundamental of the angle calculating process performed by the angle calculating circuit.

FIGS. 3 and 11 illustrate explanatory diagrams showing an angle calculating process performed by the angle calculating circuit 11. As hereinbefore described, Charts A to D in FIG. 3 represent waveforms of the magnetic sensor arrays 5A to 5D, respectively, which are exhibited when the rotatable member 1 undergoes rotation, where the axis of abscissa represents positions of the magnetic sensor elements 5a in the respective magnetic sensor arrays 5A to 5D, which are arranged in a line, and the axis of ordinate represents the intensity of the magnetic field detected.

Let it be assumed that a zero-crossing-position, which is a boundary between the N magnetic pole and the S magnetic pole of the magnetic generating element 4 lie at positions X1 and X2 as shown in FIG. 11. In this condition, the respective outputs from the magnetic sensor arrays 5A to 5D are represented by the respective waveforms shown in Charts A to D of FIG. 3. Accordingly, the zero-crossing-positions X1 and X2 can be calculated by collinear approximation of the respective outputs from the magnetic sensor arrays 5A to 5D are linearly.

The angle calculation can be carried out with the following equation (1):

$$\theta = \tan^{-1}(2L/b) \quad (1)$$

where $\theta$ represents the angle of rotation of the magnetic generating element 4, which is expressed in terms of the absolute angle, 2L represents the length of one of the four sides depicted by the magnetic sensor arrays 5A to 5D and b represents the transverse length between the zero-crossing-positions X1 and X2 as measured in a transverse direction.

Where the zero-crossing-positions X1 and X2 lie on the magnetic sensors 5B and 5D, respectively, the angle of rotation $\theta$ can be calculated in a manner similar to that described above, using data on the zero-crossing-positions which can be obtained from the respective outputs of the magnetic sensor arrays 5B and 5D.

As described above, by using the rotation angle detecting device 3, since the angle of rotation is calculated from the zero-crossing-positions in the magnetic field distribution, the detecting accuracy can be increased. Also, since information on the angle is acquired from the pattern of magnetic fields, no axial alignment of the rotation angle detecting device 3 is needed, thus facilitating the fitting.

In this rotation angle detecting device 3, in the event that the arrangement of the magnetic generating element 4 displaces axially relative to the semiconductor chip 8, since the discontinued portion exists at each of the four corners of the rectangular shape depicted by the magnetic sensor arrays 5A to 5D as hereinbefore described, the NS boundary line in the distribution of the magnetic field emanating from the magnetic generating element 4 represents, for example, such a condition as shown in FIG. 10 and, therefore, it may occur that the zero-crossing-positions for the detection of the NS boundary line cannot be found anywhere on the magnetic sensor arrays 5A to 5D depicting the rectangular shape. In other words, in FIG. 10, the left zero-crossing-position indicated by a symbol "a" on a left side of the rectangular shape can be detected by the magnetic sensor array 5D, but the right zero-crossing-position lies in a gap between the magnetic sensor array 5A on the upper side and the magnetic sensor array 5B on the right side and cannot therefore be detected by any of those magnetic sensor arrays 5A and 5B.

However, even in such case, in such rotation angle detecting device 3, the right zero-crossing-position indicated by a symbol "b" can be detected by the auxiliary magnetic sensor array 5A' arranged on the upper right corner. In view of this, in this case, the angle calculating circuit 11 detects the left zero-crossing-position from the signal, which is an output from the magnetic sensor array 5D processed by the signal processing circuit 15D, and also detects the right zero-crossing-position from the signal, which is an output from the auxiliary magnetic sensor array 5A' processed by the signal processing circuit 15A' so that based on those zero-crossing-positions, the angle $\theta$ of rotation of the magnetic generating element 4 at that time can be calculated.

As hereinabove described, in this rotation angle detecting device 3, since separate from the four magnetic sensor arrays 5A to 5D depicting the rectangular shape, the auxiliary magnetic sensor arrays 5A' to 5D' supplemental to the magnetic sensor arrays 5A to 5D are arranged outside the four corners of the rectangular shape, respectively, even when the arrangement of the magnetic generating element 4 displaces axially considerably relative to the magnetic sensor arrays 5A to 5D, the zero-crossing-position can be detected by the auxiliary magnetic sensor arrays 5A' to 5D' and the angle of rotation of the magnetic generating element 4 can be detected stably with a high accuracy, without increasing a detection error resulting from the displacement in arrangement.

Also, since the discontinued portions of the four magnetic sensor arrays 5A to 5D depicting the rectangular shape are filled up by the four auxiliary magnetic sensor arrays 5A' to 5D' added to the four corners of the rectangular shape so depicted, there is no need to allow one end portions of the magnetic sensor arrays 5A to 5D depicting the rectangular shape to protrude outwardly from the respective corners of the rectangular shape such as observed in the conventional construction. As a result thereof, without increasing the dimensions of arrangement of the magnetic sensor arrays 5A to 5D depicting the rectangular shape, it is possible to prevent the angle detection error from occurring and to construct compactly with the circuit forming area reduced.

Although the respective outputs from the auxiliary magnetic sensor arrays 5A' to 5D' may be processed by the concurrent utilization of the signal processing circuits 15A to 15D associated respectively with the magnetic sensor arrays 5A to 5D depicting the rectangular shape, the length of time required to read out in such case will increase as a result of an increase of the number of pixels, resulting in reduction in detection rate. Where as is the case with this embodiment, the respective outputs from the magnetic sensor arrays 5A' to 5D' are processed by the additionally utilized signal processing circuits 15A' to 15D', the outputs from the magnetic sensor arrays 5A to 5D and the outputs from the auxiliary magnetic sensor arrays 5A' and 5D' can be simultaneously processed in parallel relation to each other and, therefore, the detecting accuracy and the detecting stability can be increased while maintaining the angle detecting rate, without any increase in signal processing time which would otherwise result from an increase of the auxiliary magnetic sensor arrays 5A' to 5D'. In other words, the additional provision of the signal processing circuits 15A' to 15D' (the signal read-out circuits 9 and the AD converting circuits 10) one for each of the auxiliary magnetic sensor arrays 5A' to 5D' is effective to achieve a surface mounting of the additionally employed auxiliary magnetic sensor arrays 5A' to 5D' without increasing the read-out time.

Figure 12:
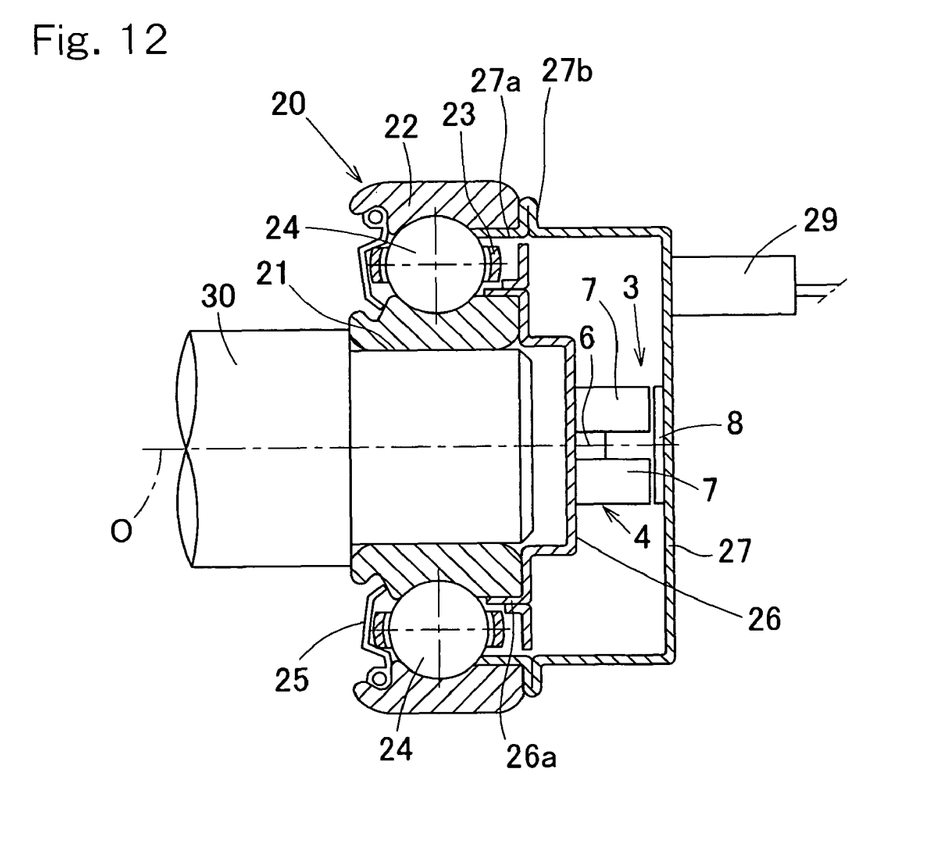
FIG. 12 is a sectional view showing an example of a rolling bearing assembly equipped with the rotation angle detecting device according to the first embodiment of the present invention.

FIG. 12 illustrates an example, in which the rotation angle detecting device 3 according to the first embodiment is incorporated in a rolling bearing assembly. The illustrated rolling bearing assembly 20 is of a type including rolling elements 24 retained by a retainer 23 and interposed between a raceway of an inner ring 21 and a raceway of an outer ring 22. The rolling elements 24 are in the form of a ball and this rolling bearing assembly 20 is rendered to be a deep groove ball bearing. Also, a sealing member 25 sealing one end of a bearing space is fitted to the outer ring 22. The inner ring 21 having a rotary shaft 30 inserted therein is supported by the outer ring 22 through the rolling elements 24. The outer ring 22 is arranged in a housing (not shown) of a machine that utilizes the bearing assembly.

A magnetic generating element mounting member 26 is fitted to the inner ring 21 and the magnetic generating element 4 is mounted on this magnetic generating element mounting member 26. This magnetic generating element mounting member 26 is so provided as to cover an inner diametric hole at one end of the inner ring 21 and is fitted to the inner ring 21 by engaging a cylindrical portion 26a provided at an outer peripheral edge, with a shoulder outer peripheral surface of the inner ring 21. Also, a side plate portion proximate to the cylindrical portion 26a is engaged with an end face of the inner ring 21 to thereby accomplish an axial positioning.

The outer ring 22 has a sensor mounting member 27 fitted thereto and the semiconductor chip 8, on which the magnetic sensor arrays 5A to 5D, the signal read-out circuits 9A to 9D, the AD converting circuits 10A to 10D and the angle calculating circuit 11 have been integrated, is fitted to this sensor mounting member 27. Also, an output cable 29 for drawing the output outwardly from the angle calculating circuit 11 is fitted to this sensor mounting member 27. The sensor mounting member 27 has a free end cylindrical portion 27a at an outer peripheral portion thereof fitted into an inner diametric surface of the outer ring 22, and is axially positioned by engaging a collar 27b, formed in the proximity of the free end cylindrical portion 27a, with an end face of the outer ring 22.

As hereinabove described, when the rotation angle detecting device 3 is integrated with the bearing assembly 20, not only can the number of component parts of the bearing utilizing machine and the number of assembling steps be reduced, but compactization can also be achieved. It is to be noted that although reference has been made to the example, in which the rotation angle detecting device 3 according to the first embodiment that is incorporated in the rolling bearing assembly, the rotation angle detecting device according to any one of the second and third embodiments can be equally incorporated in the rolling bearing assembly. Where the rotation angle detecting device 3 according to the second embodiment is incorporated in the rolling bearing assembly, the rotation angle detecting device 3 can reduce the length of time required to read out the sensor signals without adversely affecting the detecting accuracy and, therefore, even in a bearing assembly that rotates at high speed, a satisfactory rotation angle output can be obtained. Also, where the rotation angle detecting device according to the third embodiment is incorporated in the rolling bearing assembly, the rotation angle detecting device 3 can detect the rotation angle stably and accurately without being accompanied by an increase of the detection error resulting from the displacement of arrangement and, therefore, assemblage of the rotational detecting device 3 into the bearing assembly 20 can be facilitated.

What is claimed is:

1. A rotation angle detecting device which comprises:
a magnetic generating element arranged on a rotatable member and having a magnetic anisotropy in a circumferential direction about the axis of rotation;
four linear magnetic sensor arrays arranged on a non-rotatable member confronting the magnetic generating element in a direction along the axis of rotation and arranged in a plane perpendicular to the axis of rotation, each of the sensor arrays being arranged along one of four sides of an imaginary rectangular shape;
a signal read-out circuit for reading respective outputs of the four magnetic sensor arrays;
an AD converting circuit for converting each of the signals so read out into a respective digital signal; and
an angle calculating circuit for calculating the angle of rotation of the magnetic generating element from an output of the AD converting circuit,
wherein the magnetic sensor arrays, the signal read-out circuit, the AD converting circuit and the angle calculating circuit are all mounted on one semiconductor chip, the signal read-out circuit and the AD converting circuit are arranged outside the magnetic sensor arrays arranged in a generally rectangular pattern, and the angle calculating circuit is arranged inside the magnetic sensor arrays arranged in a generally rectangular pattern.

2. The rotation angle detecting device as claimed in claim 1, wherein an outer periphery of the angle calculating circuit is surrounded by a shield pattern so that a gap area between the magnetic sensor arrays and the angle calculating circuit is formed as a digital noise shielding area.

3. The rotation angle detecting device as claimed in claim 1, wherein each of the magnetic sensor array is divided into two magnetic sensor element sets and is associated with two signal processing circuits, each of which includes the signal read-out circuit and the AD converting circuit and corresponds to each of the two magnetic element sets, so that the two signal processing circuits simultaneously read out signals from respective magnetic element sets.

4. The rotation angle detecting device as claimed in claim 3, wherein the two signal processing circuits are so associated with each of the magnetic sensor arrays as to read out from the magnetic sensor element sets corresponding respectively to opposite end portions into which the magnetic sensor array is divided in a direction lengthwise thereof.

5. The rotation angle detecting device as claimed in claim 3, wherein the two signal processing circuits associated with each of the magnetic sensor arrays include respective signal read-out circuits for reading out and amplifying an output from the magnetic sensor array, and the AD converting circuit for converting an output of the signal read-out circuit into a digital signal is commonly utilized by the two signal processing circuits.

6. The rotation angle detecting device as claimed in claim 1, further comprising four auxiliary magnetic sensor arrays, each of which is arranged outside respective four corners of the rectangular shape depicted by the four magnetic sensor arrays.

7. The rotation angle detecting device as claimed in claim 6, wherein the signal read-out circuit and the AD converting circuit for converting a read-out signal therefrom into a digital signal, which is in turn supplied to the angle calculating circuit, are provided for each of the auxiliary sensor arrays arranged outside the four corners of the rectangular shape.

8. A rotation angle detecting device equipped bearing assembly equipped with the rotation angle detecting device as defined in claim 1.

* * * * *